United States Patent
So

(10) Patent No.: US 9,468,340 B2
(45) Date of Patent: Oct. 18, 2016

(54) FOOD PROCESSING APPARATUS

(71) Applicant: Ki Mee Metal & Plastic Factory Limited, Hong Kong (CN)

(72) Inventor: Shun So, Hong Kong (CN)

(73) Assignee: KI MEE METAL & PLASTIC FACTORY LIMITED, Hong Kong (CN)

( * ) Notice: Subject to any disclaimer, the term of this patent is extended or adjusted under 35 U.S.C. 154(b) by 104 days.

(21) Appl. No.: 14/487,631

(22) Filed: Sep. 16, 2014

(65) Prior Publication Data

US 2015/0075392 A1 Mar. 19, 2015

Related U.S. Application Data

(63) Continuation-in-part of application No. 14/027,461, filed on Sep. 16, 2013.

(51) Int. Cl.
*F26B 25/16* (2006.01)
*A47J 43/08* (2006.01)
*A47J 43/24* (2006.01)

(52) U.S. Cl.
CPC ............ *A47J 43/082* (2013.01); *A47J 43/24* (2013.01)

(58) Field of Classification Search
CPC .............. F26B 3/00; F26B 5/00; F26B 9/00; F26B 19/00; F26B 21/00; F26B 25/00; F26B 25/16; F16H 21/00; F16H 21/18; A23L 1/00; A23L 1/015; A47J 43/00; A47J 43/018; A47J 43/24
USPC ...... 34/558.6, 90; 99/495; 366/247; 422/297
See application file for complete search history.

(56) References Cited

U.S. PATENT DOCUMENTS

| | | | | |
|---|---|---|---|---|
| 5,724,751 A * | 3/1998 | Ellingsen | ................ | B01D 1/18 34/147 |
| 6,085,442 A * | 7/2000 | Erickson | ................ | A01J 11/04 34/197 |
| 7,028,415 B2 * | 4/2006 | Heinzen | ................ | F26B 5/08 34/312 |
| 7,080,463 B1 * | 7/2006 | Johnson | ................ | A47J 43/24 34/312 |
| 7,958,650 B2 * | 6/2011 | Turatti | ................ | F26B 25/002 15/3.2 |
| 7,975,605 B2 | 7/2011 | Wan et al. | | |
| 8,539,693 B2 * | 9/2013 | Perry | ................ | A47J 43/24 188/72.9 |
| 9,234,701 B2 * | 1/2016 | Wada | ................ | B02C 13/282 |
| 2006/0144257 A1 * | 7/2006 | Cheng | ................ | A47J 43/24 99/511 |
| 2007/0137504 A1 | 6/2007 | Wan et al. | | |
| 2007/0180727 A1 | 8/2007 | Wan et al. | | |

(Continued)

FOREIGN PATENT DOCUMENTS

| | | | | |
|---|---|---|---|---|
| CH | WO 2008096319 A1 * | 8/2008 | ............. | A47J 43/24 |
| CN | EP 1797805 A1 * | 6/2007 | ......... | A47J 43/1018 |
| WO | WO 2005115209 A1 * | 12/2005 | ............. | A47J 43/24 |

*Primary Examiner* — Stephen M Gravini
(74) *Attorney, Agent, or Firm* — Leydig, Voit & Mayer, Ltd.

(57) ABSTRACT

A food processing apparatus has a housing, an internal basket and a drive mechanism on the housing for rotating the basket to process food (e.g., spinning water from food) in the housing. The drive mechanism has an operating lever, a gearwheel arranged to be rotated by the lever and the basket for rotating the basket, and a centrifugal clutch located between the lever and the gearwheel for transmitting a rotational drive force from the lever to the gearwheel. A brake mechanism on the housing has a braking member for frictional engagement with the gearwheel to stop rotation of the basket. The drive mechanism may rotate the basket selectively in opposite directions.

19 Claims, 13 Drawing Sheets

(56) References Cited

U.S. PATENT DOCUMENTS

| | | | |
|---|---|---|---|
| 2008/0223226 A1* | 9/2008 | Holcomb | A47J 42/04 99/495 |
| 2008/0277513 A1 | 11/2008 | Holcomb et al. | |
| 2009/0114104 A1 | 5/2009 | Sawhney et al. | |
| 2010/0263555 A1 | 10/2010 | Mah et al. | |
| 2013/0180414 A1* | 7/2013 | Chan | F16H 19/04 99/505 |
| 2014/0338546 A1 | 11/2014 | Repp et al. | |
| 2015/0075023 A1* | 3/2015 | So | A47J 43/24 34/58 |
| 2015/0075392 A1* | 3/2015 | So | A47J 43/24 99/495 |

* cited by examiner

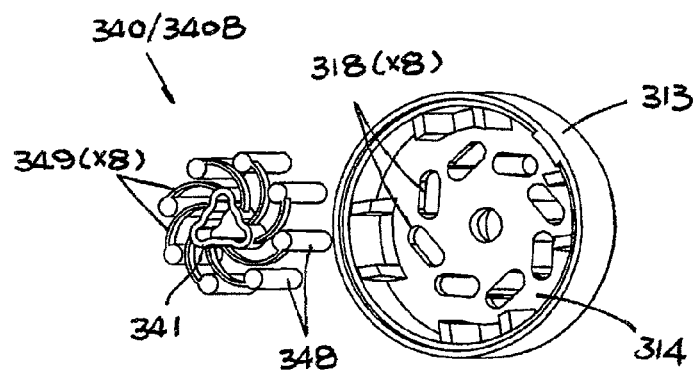
FIG. 3A
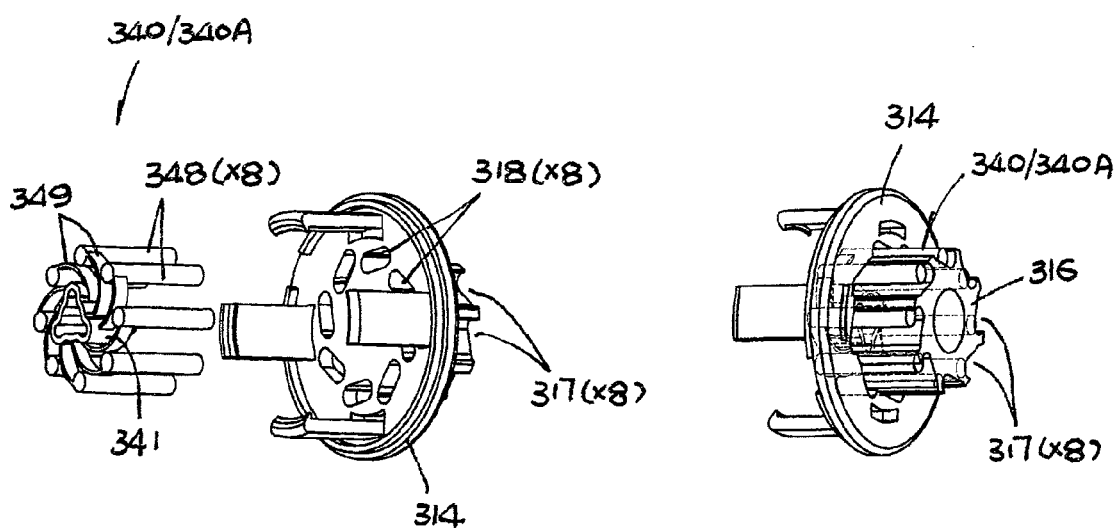
FIG. 3B
FIG. 3C

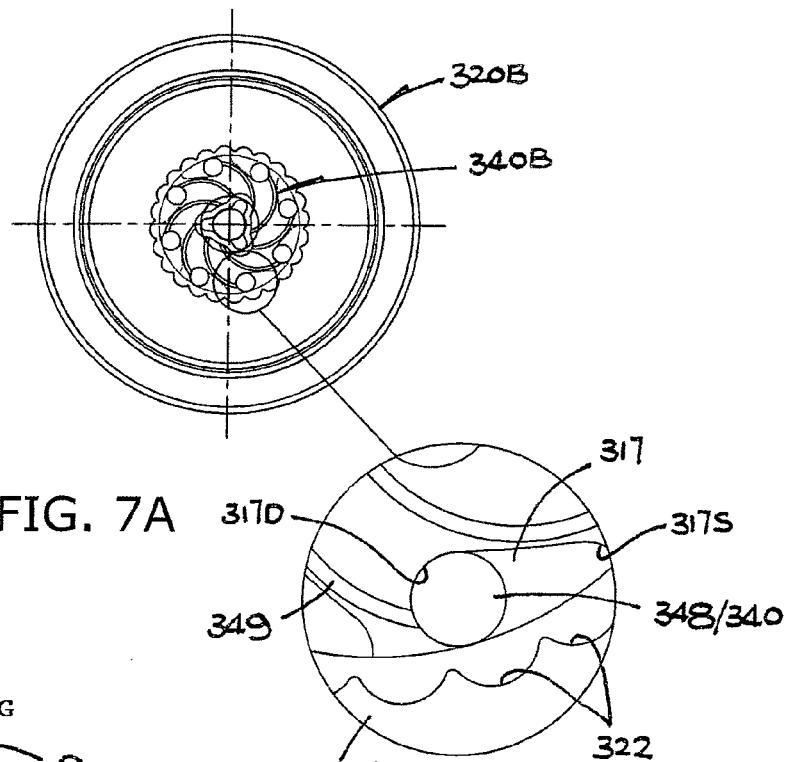
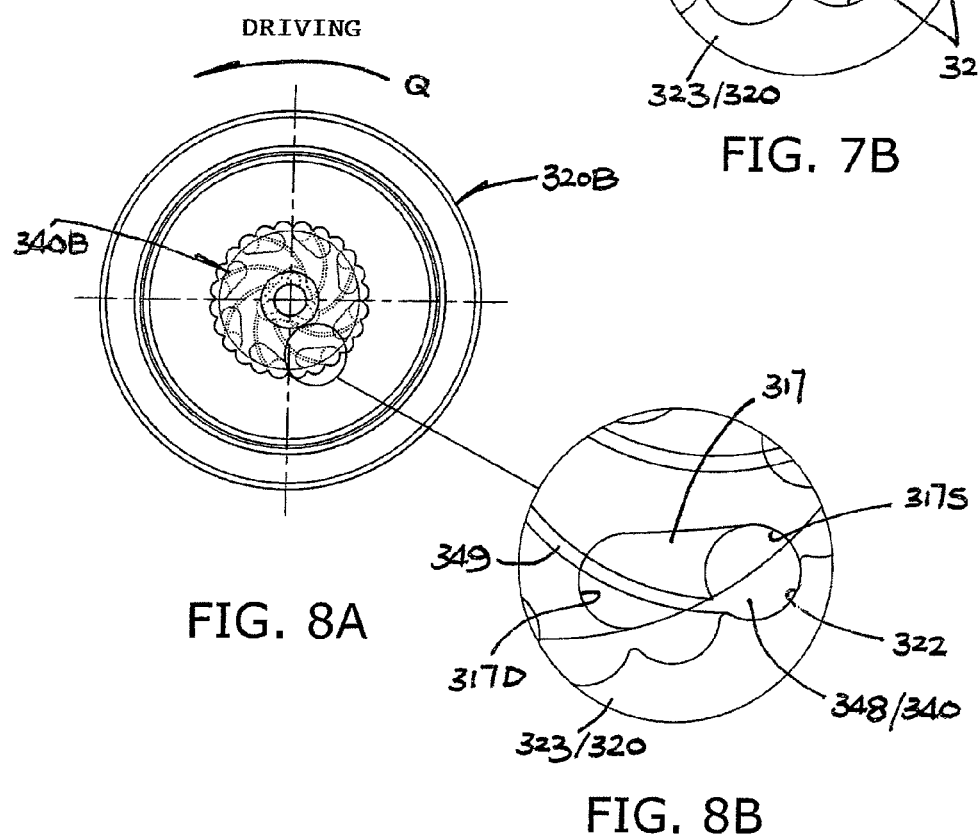
FIG. 7A
FIG. 7B
FIG. 8A
FIG. 8B

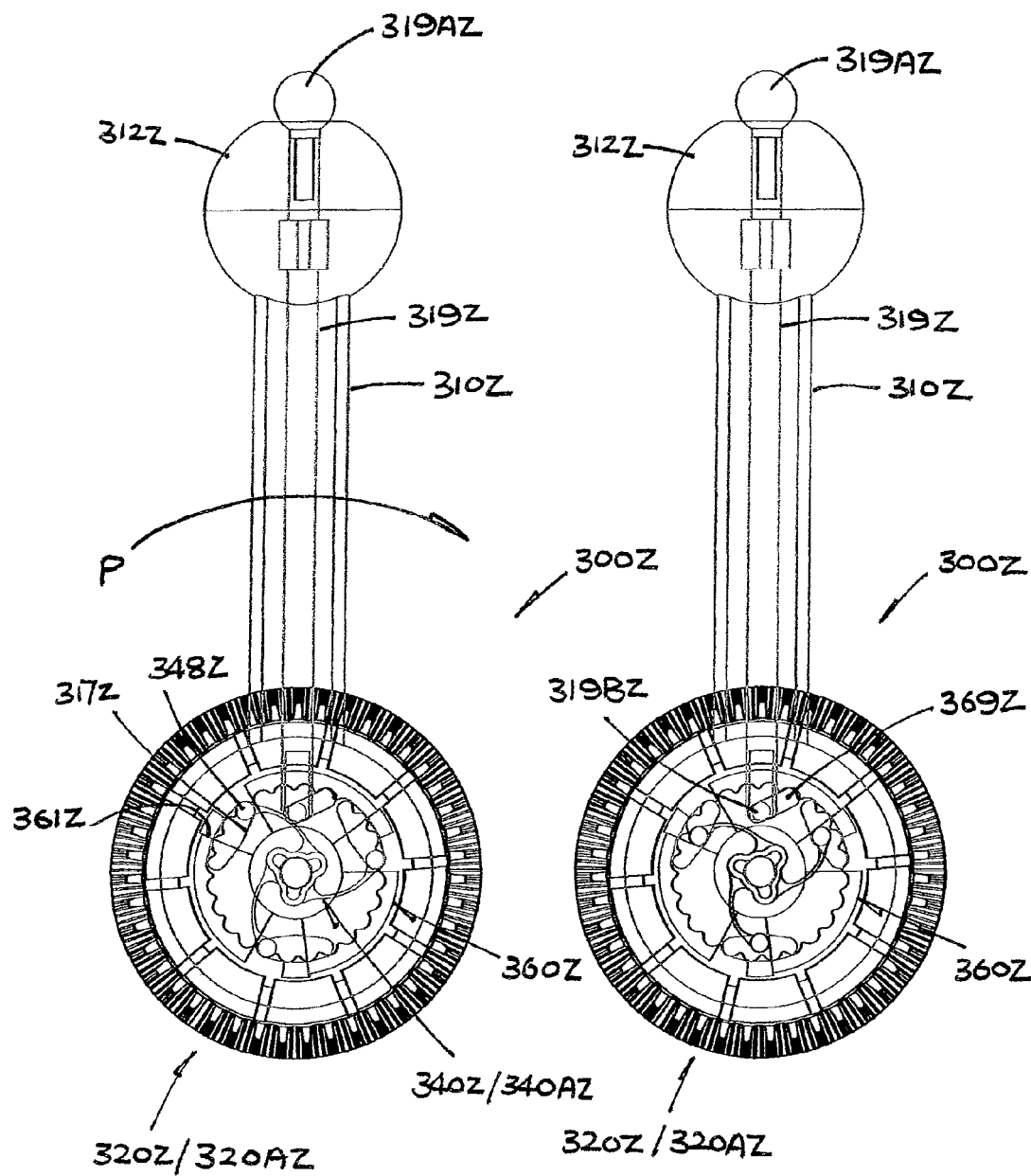

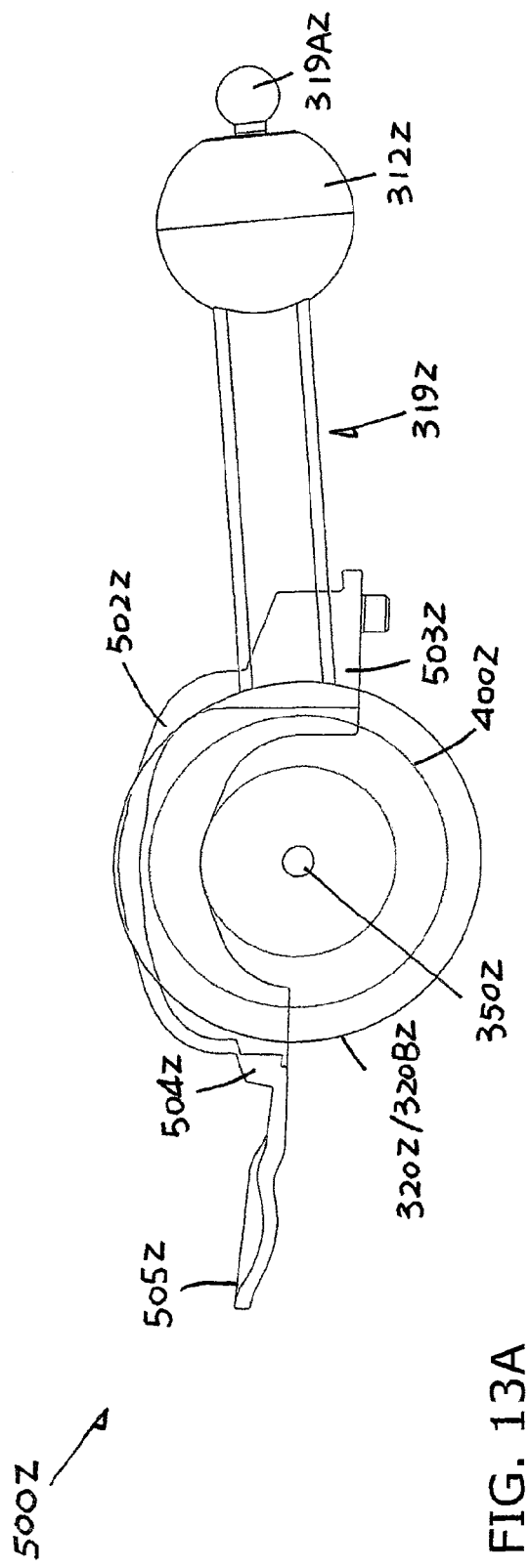
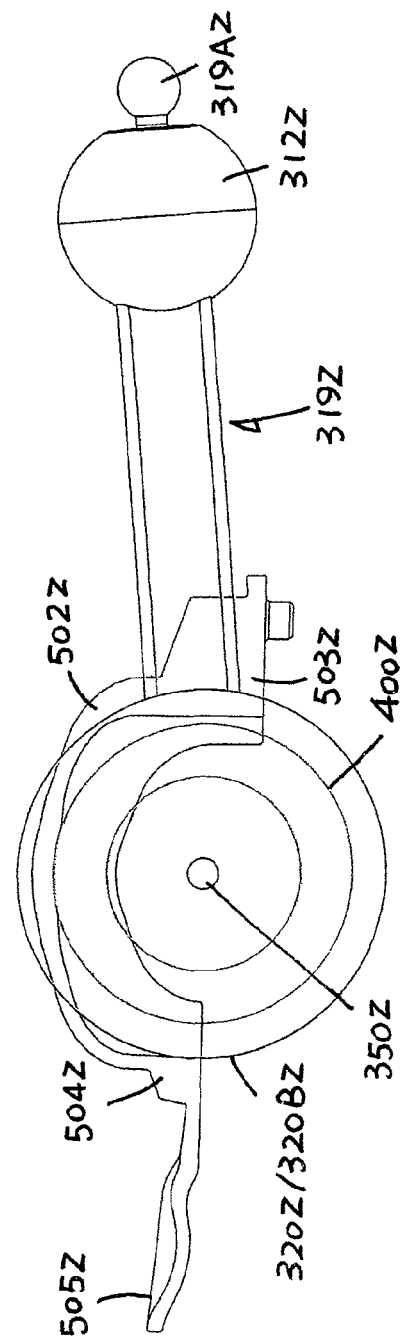
FIG. 13A
FIG. 13B ns has two
FOOD PROCESSING APPARATUS

The present invention relates to a food processing apparatus that is manually operated and includes a brake to stop operation and may operate in opposite directions.

BACKGROUND OF INVENTION

Food processing apparatus such as food spinners are commonly in the kitchens for quickly spinning off water from food such as salad, vegetable or the like. Most of such spinners are hand-operated. A typical construction includes a bowl-shaped housing, a basket supported in the housing for rotation, and a drive mechanism for rotating the basket to spin off water from food in the basket. Whilst the drive mechanism should be designed to rotate the basket as fast as possible to spin off water quickly, the direction of rotation of the basket and the ability to brake the basket are two concerns to users.

The invention seeks to provide a new or otherwise improved food processing apparatus to address at least one of these concerns.

SUMMARY OF THE INVENTION

According to the invention, there is provided a food processing apparatus comprising a housing, a food processing device supported in the housing for rotation about an axis of rotation, and a drive mechanism supported by the housing for rotating the food processing device to process food in the housing. The drive mechanism comprises a manual operating member, a gearwheel arranged to be rotated by the manual operating member and in drive transmission with the food processing device for in turn rotating the food processing device, and a centrifugal clutch provided between the manual operating member and the gearwheel for transmitting rotational drive from the manual operating member to the gearwheel. A brake mechanism is supported by the housing for braking the food processing device, which comprises a braking member for frictional engagement to stop rotation of the food processing device.

Preferably, the manual operating member is supported for reciprocation in opposite directions, and the centrifugal clutch is adapted to hold and transmit rotational drive in one direction to the gearwheel and to slip in the opposite direction.

In a preferred embodiment, the centrifugal clutch is in stationary engagement with the manual operating member for simultaneous motion and is in releasable engagement with the gearwheel.

More preferably, the centrifugal clutch comprises at least two keying members located between the manual operating member and the gearwheel, the keying members being supported by respective flexible links and being movable outwards by centrifugal action upon rotation of the centrifugal clutch to engage with the gearwheel.

Further more preferably, the centrifugal clutch includes a guiding surface for interaction with each keying member, the guiding surface being inclined outwardly in a driving direction of the centrifugal clutch to hold the keying member in engagement with the gearwheel in the driving direction and being inclined inwardly in the opposite non-driving direction of the centrifugal clutch to release the keying member from engagement with the gearwheel in the non-driving direction.

Yet further more preferably, the keying members are provided by respective parallel keying rods in a cylindrical arrangement, with the keying rods extending axially of the cylindrical arrangement and the flexible links lying on an imaginary plane at one end of the cylindrical arrangement.

Yet further more preferably, the centrifugal clutch is disposed co-axially on a generally cylindrical former connected with the manual operating member, the former having parallel recesses each of which includes a respective guiding surface and locates a respective keying rod in a loose manner.

In a first preferred embodiment, each recess has a relatively shallower part for holding the respective keying rod outwards in engagement with the gearwheel and a relatively deeper part to give room allowing the keying rod to disengage from the gearwheel, with the respective guiding surface extending across the relatively shallower part and the relatively deeper part.

In a second preferred embodiment, each recess has two opposite ends each providing a said relatively shallower part, a middle portion between the opposite ends and providing the relatively deeper part, and a pair of said guiding surfaces extending across each opposite end and the middle portion, the pair of guiding surfaces being inclined in opposite directions for selective interaction with a respective keying member in opposite driving directions.

More preferably, the drive mechanism includes a selector operable to select either one guiding surface of the pair of guiding surfaces for interaction with the keying member in the respective driving direction, such that the drive mechanism is operable to rotate the food processing device selectively in either one of opposite directions.

Further more preferably, the selector is in loose engagement with the centrifugal clutch to thereby restrict relative movement and hence interaction of the keying members of the centrifugal clutch with respect to either one guiding surface selected from the pair of guiding surfaces.

Yet further more preferably, the selector is angularly movable for operation, and the drive mechanism includes a manual operator arranged to change the angular position of the selector in order to select between the pair of guiding surfaces for interaction with the keying member in the respective driving direction.

Yet further more preferably, the manual operator comprises an elongate member provided internally of the manual operating member.

In a preferred embodiment, the drive mechanism includes a guiding member in engagement with the centrifugal clutch for determining the direction of clutching action of the centrifugal clutch, and a selector in engagement with the centrifugal clutch for changing the relative position between the centrifugal clutch and the guiding member in order to select either one of two opposite directions of clutching action, thereby enabling the drive mechanism to rotate the food processing device selectively in opposite directions.

More preferably, the guiding member is inclined in opposite directions for selective engagement with the centrifugal clutch dependent upon the relative position between the centrifugal clutch and the guiding member.

It is preferred that the drive mechanism includes a train of gears for transmitting rotational drive from the centrifugal clutch to the food processing device, which has the gearwheel as the first gear in the train and includes at least one other gearwheel as the last gear in drive engagement with the food processing device for rotating the food processing device.

In a preferred embodiment, the brake mechanism includes a brake body which is attached to the housing and supports the braking member for frictional engagement with the gearwheel to stop rotation of the food processing device.

It is preferred that the braking member is provided by a part of the brake body, which comprises a tab for inward depression into frictional engagement with the gearwheel.

It is preferred that the braking member is provided by a part of the brake body, which extends across an upper part of the gearwheel for downward movement into frictional engagement with the gearwheel.

Advantageously, the gearwheel includes a friction part via which the braking member is arranged to come into frictional engagement with the gearwheel.

In a preferred embodiment, the drive mechanism includes a pair of said gearwheels which are arranged to be rotated by the manual operating member in opposite directions respectively and are in drive transmission with the food processing device, with a corresponding said centrifugal clutch provided between the manual operating member and each gearwheel for transmitting rotational drive from the manual operating member to the corresponding gearwheel in the respective direction, and further includes a common gear in drive engagement between both gearwheels and the food processing device for rotating the food processing device, with rotational drive in opposite directions received from the gearwheels being in operation merged by the common gear into a unidirectional rotational drive for rotating the food processing device.

BRIEF DESCRIPTION OF DRAWINGS

The invention will now be more particularly described, by way of example only, with reference to the accompanying drawings, in which:

FIGS. 3A to 3C are further exploded perspective views showing parts of the drive mechanism of FIG. 2;

FIGS. 7A and 7B are enlarged sides views illustrating the non-driving operation of FIG. 5;

FIGS. 8A and 8B are enlarged side views illustrating the driving operation of FIG. 6;

FIGS. 12A and 12B are side views which show the drive mechanism of FIG. 10 stopped and rotating anti-clockwise respectively; and FIGS. 13A and 13B are side views which show the brake mechanism of FIG. 10 idle and in use respectively.

DETAILED DESCRIPTION OF PREFERRED EMBODIMENTS

Figure 1:
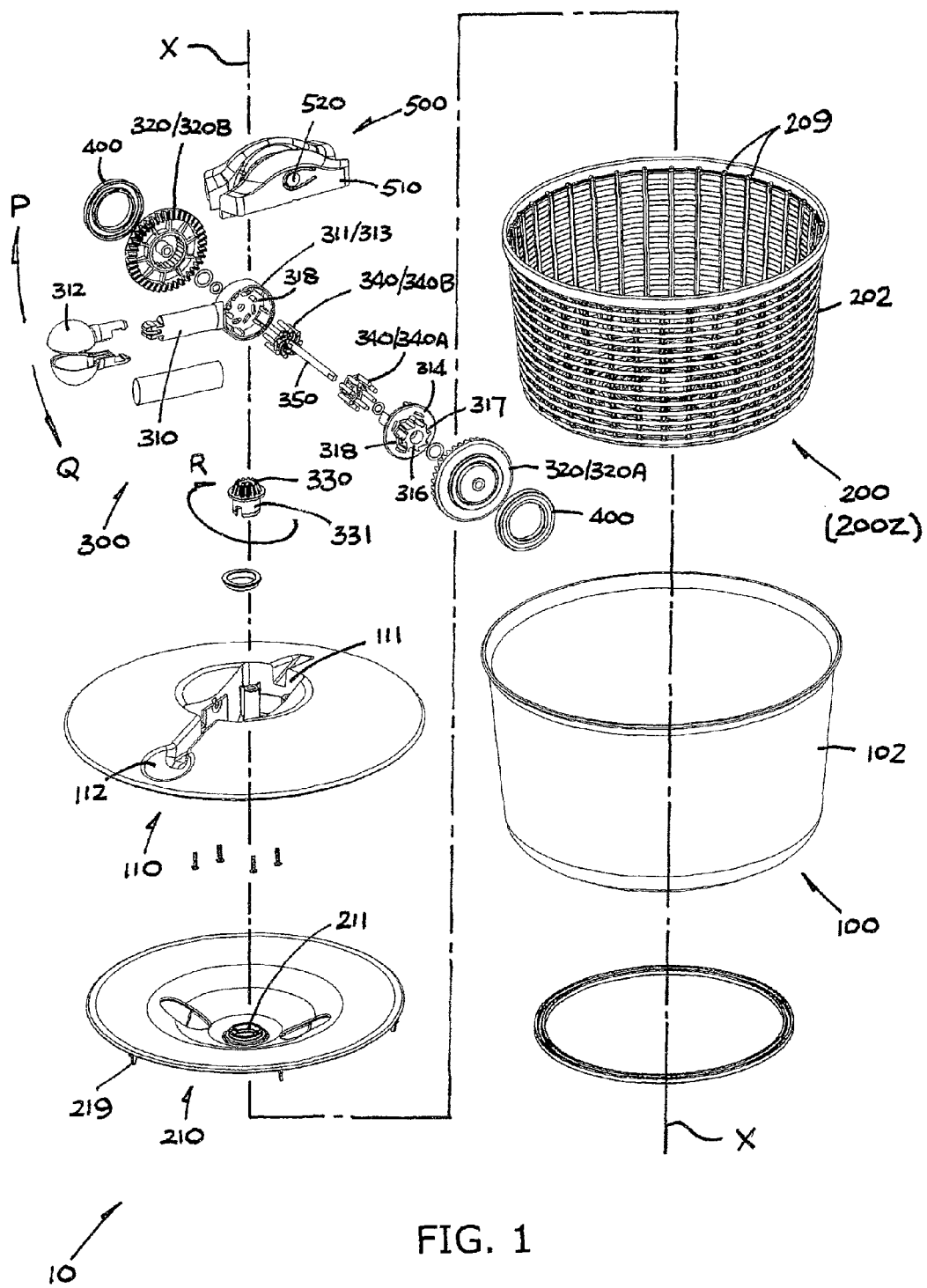
FIG. 1 is an exploded perspective view of a first embodiment of a food processing apparatus in accordance with the invention.
Figure 2:
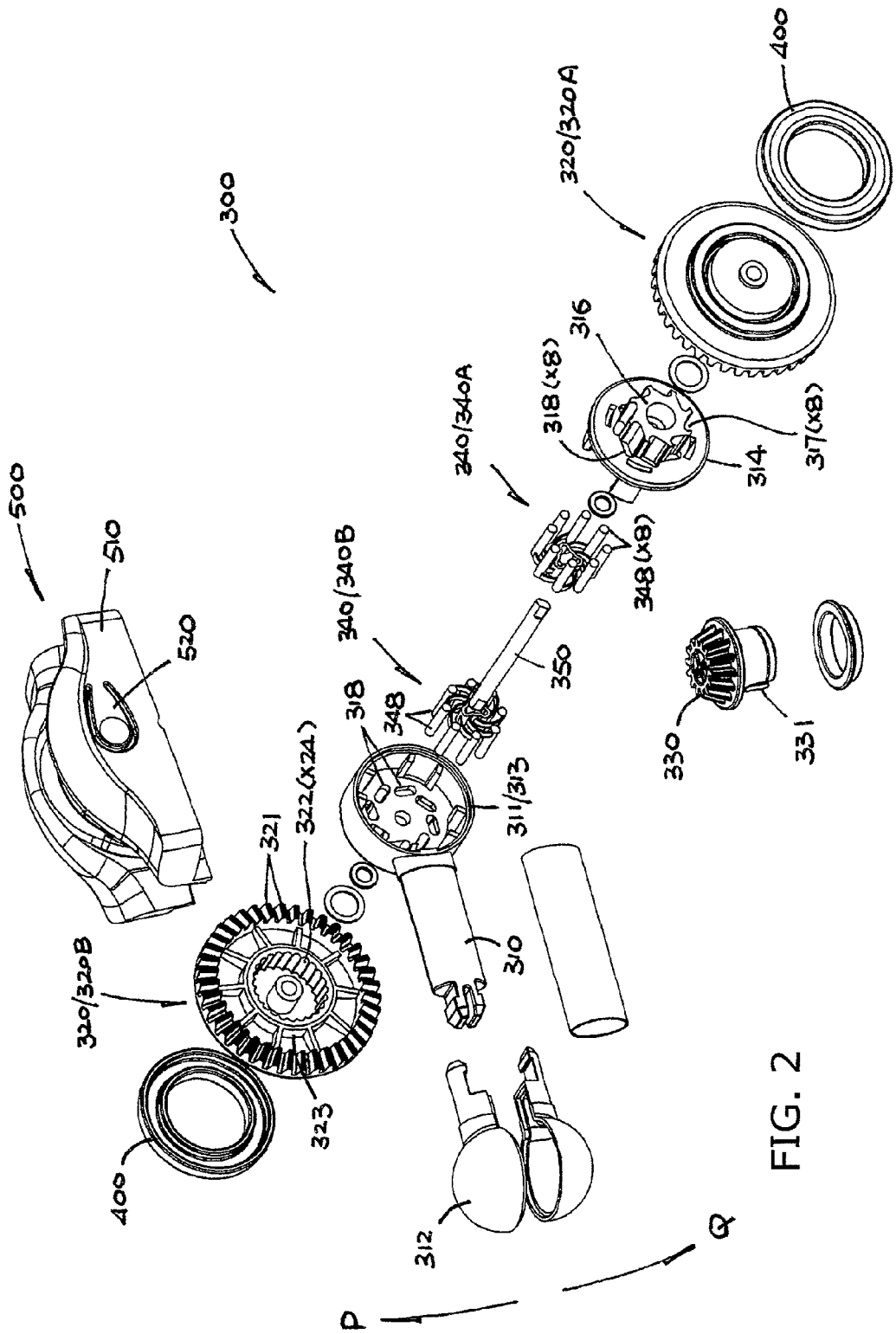
FIG. 2 is another exploded perspective view showing a drive mechanism of the food processing apparatus of FIG. 1.
Figure 4:
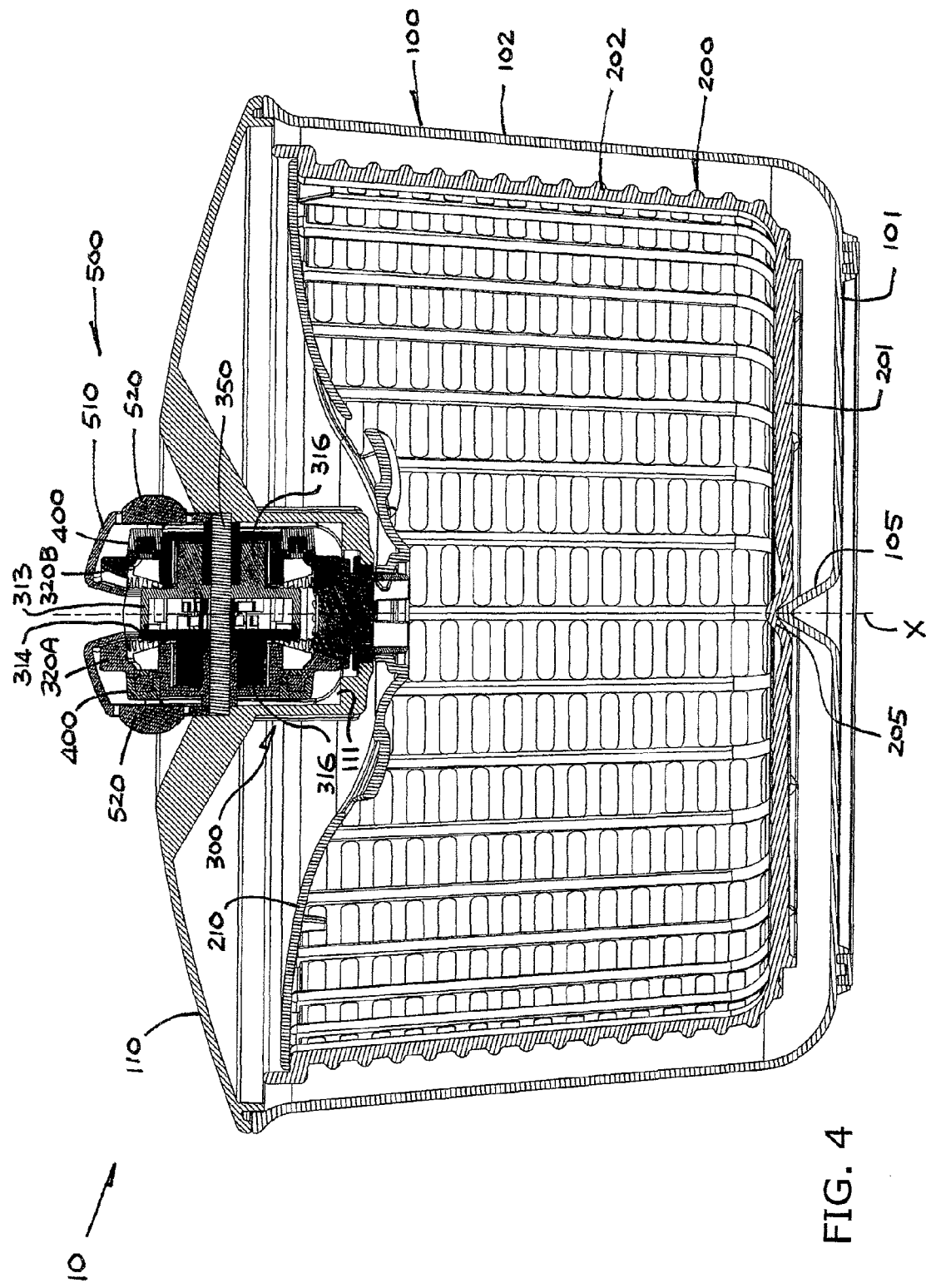
FIG. 4 is a cross-sectional side view of the food processing apparatus of FIG. 1, now assembled.

Referring initially to FIGS. 1 to 8B of the drawings, there is shown a first food processing apparatus embodying the invention, which is in the form of, for example, a salad spinner 10 for salad or vegetable, etc. The salad spinner 10 includes a generally cylindrical housing 100 having a round top cover 110, a generally cylindrical basket 200 located in the housing 100 and supported for rotation about a common vertical central axis X, and a drive mechanism 300 supported by the cover 110 for rotating the basket 200 so as to spin off water from salad or vegetable contained in the basket 200.

There is also a brake mechanism 500 which is supported by the housing 100, and partially located in a recessed central region or central recess 111 of the housing cover 110, for braking the basket 200 to stop rotation of the basket 200.

The basket 200, being in general a perforated container, is an example of a food processing device for rotation to process food in the housing 100, that is in this particular embodiment separating water from salad or the like. The basket 200 is normally closed by its own round lid 210 which couples the basket 200 to be in drive engagement with the drive mechanism 300 for rotation thereby.

The housing 100 has a round bottom 101 and a cylindrical side wall 102 on the bottom 101, with a central spike 105 projecting upwardly from the bottom 101. Similarly but slightly smaller in size, the basket 200 has a round bottom 201 and a cylindrical side wall 202 upstanding integrally therefrom. The basket bottom 201 has a central dent 205 which faces downwards and bears upon the spike 105, such that the basket 200 is rotatable about the central axis X. The basket 200 with lid 210 is slightly smaller than the interior of the housing 100 with cover 110, and fits loosely therein.

The lid 210 and the basket 200 are coupled together for simultaneous rotation through angular inter-engagement between peripheral lugs 219 on lid's lower surface and reinforcement ribs 209 on the basket's inner surface, such that the basket 200 and lid 210 will rotate and stop at the same time.

The housing cover 110 is convex upwardly and the basket lid 210 concave downwardly, together forming between them a circular central cavity in which the drive mechanism 300 is located.

The drive mechanism 300 is formed by a manual operating member 310, and a set of gears having a pair of gearwheels 320A and 320B and a third, common gear 330 arranged to be rotated by the manual operating member 310 and in drive transmission with the basket 200 for in turn rotating the basket 200. The drive mechanism 300 includes a pair of centrifugal clutches 340A and 340B provided between the manual operating member 310 and the gearwheels 320A and 320B respectively for transmitting rotational drive from the manual operating member 310 to the gearwheels 320A and 320B.

In passing, the brake mechanism 500 incorporates a pair of braking members 520 which are frictionally engageable with the gearwheels 320A and 320B respectively to stop rotation of the basket 200, as will be described later.

Figure 5:
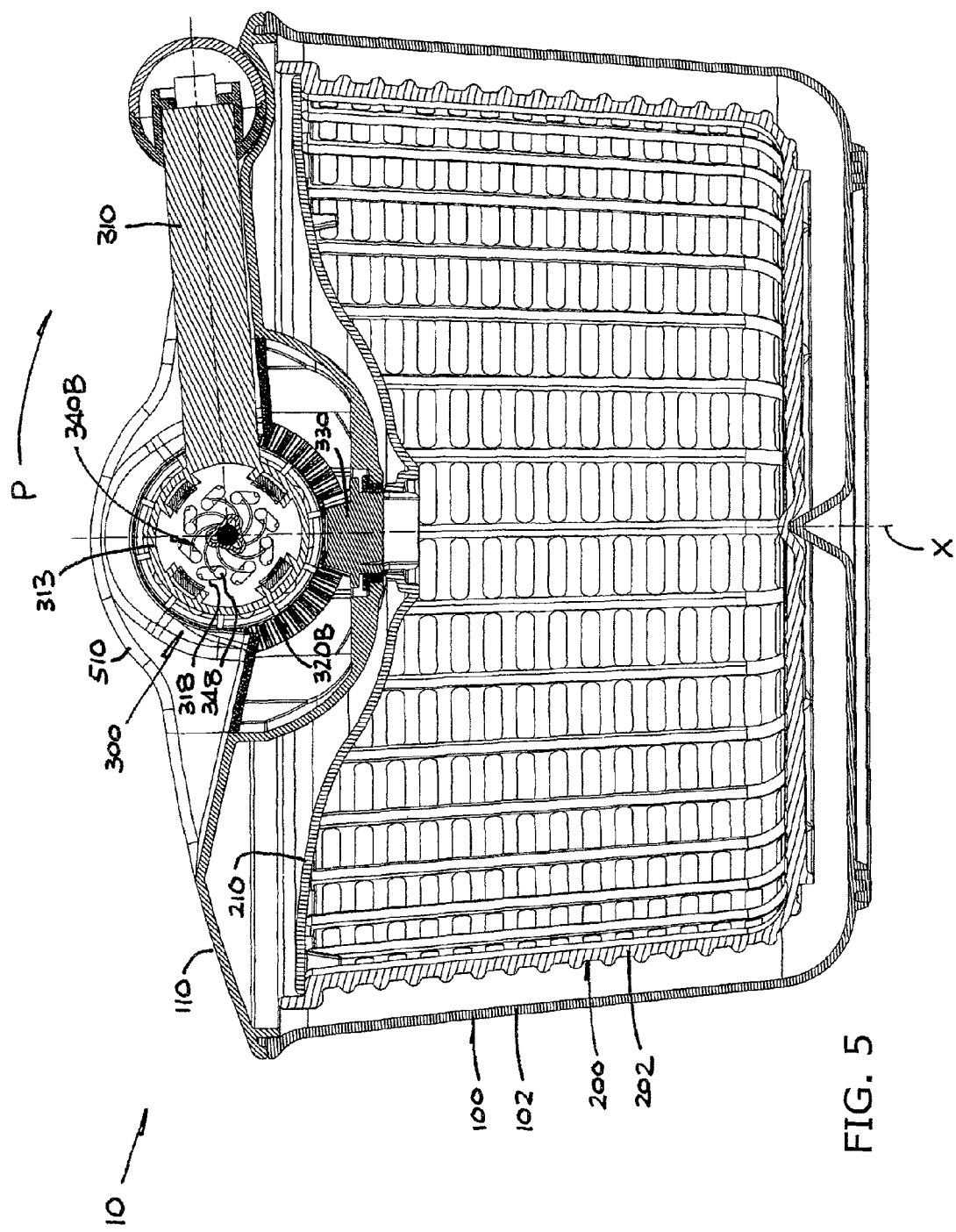
FIG. 5 is a cross-sectional side view corresponding to FIG. 4, showing the drive mechanism in part in non-driving operation.
Figure 6:
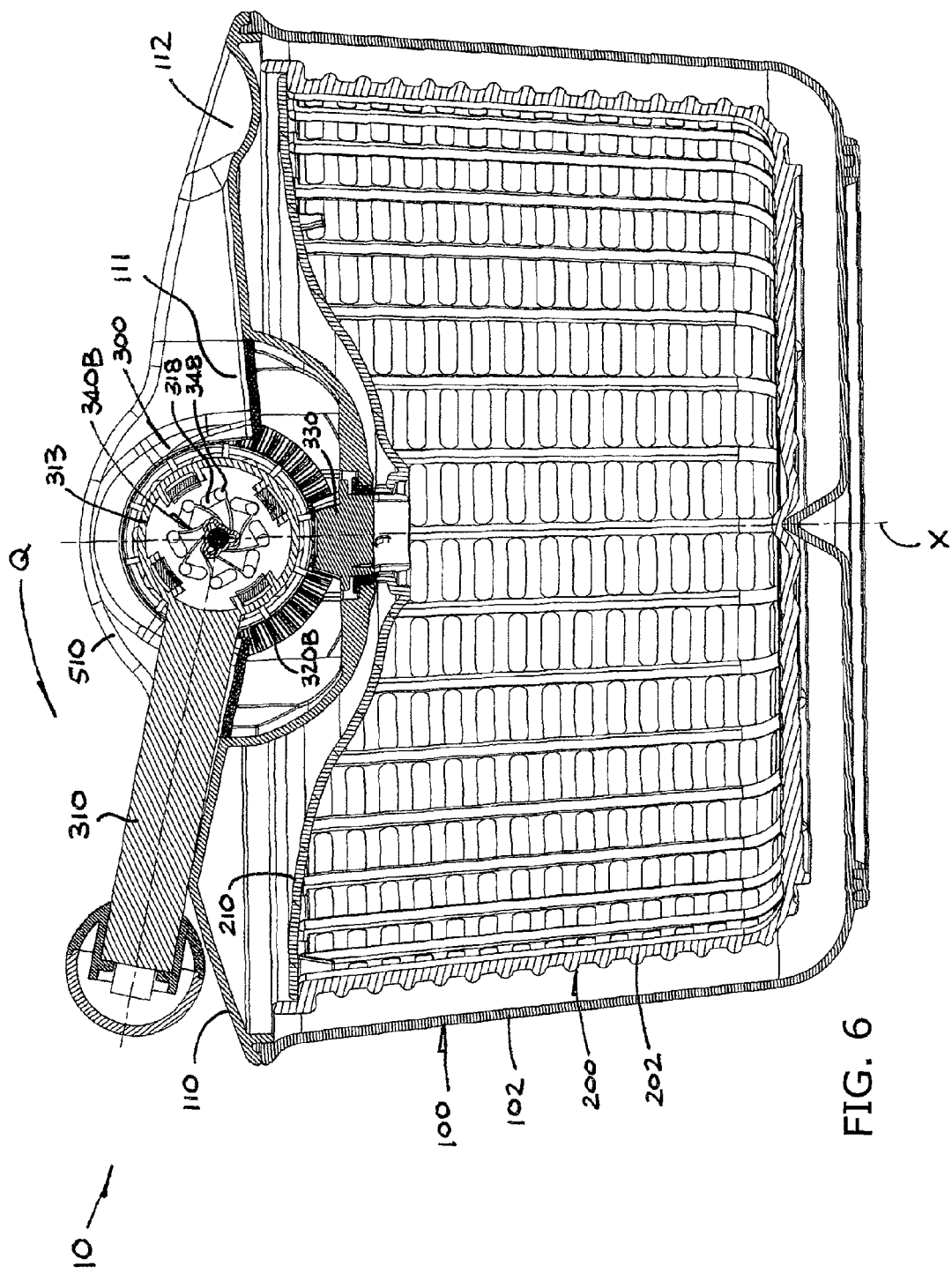
FIG. 6 is another cross-sectional side view equivalent to FIG. 5, showing the drive mechanism in part in driving operation.

The manual operating member 310 is implemented by a reciprocating lever 310 which has an inner end 311 pivotably connected in the central recess 111 of the housing cover 110 by means of a horizontal axle 350 that extends across the top of the central recess 111, with the outer end 312 being free and in the form of a knob for manipulation. The operating lever 310 is pivotable in opposite directions P and Q (FIGS. 1 and 2) between the left and right sides on the cover 110 (cf FIGS. 5 and 6) through an angle of about 160° for operating the drive mechanism 300. The cover 110 is formed with an oblong recess 112 as an extension of the central recess 111 and shaped to match the lever 310, partially into which recess 112 the lever 310 may be pivoted for storage (FIG. 5).

The inner end 311 of the lever 310 is expanded to form a two-part flat cylindrical box 313 that is disposed co-axially about the axle 350 for pivotal motion. The box 313 has two opposite flat circular end walls 314, through each of which eight identical slots 318 are formed. The slots 318 on each end wall 314 are arranged evenly in a circle about the wall's center, and are inclined or skewed at a small angle of about 20° from the circle in the clockwise direction on one end wall 314 and in the anti-clockwise direction on the opposite end wall 314.

Each end wall 314 bears a generally cylindrical hollow former 316 which projects co-axially outwardly from the end wall 314, having a cross-section within and surrounded by the circle of slots 318. On and around its cylindrical surface, the former 316 is shaped to provide eight parallel flat recesses 317, each including a guiding surface 317, at equiangular positions.

Both gearwheels 320A and 320B (collectively 320) are bevel gearwheels of identical construction (FIG. 2), each having an outer periphery bearing a ring of gear teeth 321 and an inner periphery bearing a ring of recesses 322. The recesses 322 have an identical arcuate cross-section and are provided by evenly-distributed uniform grooves 322 on and around a cylindrical inner surface of an inner collar 323 which is formed co-axially and integrally on the gear teeth's side of the gearwheel 320.

There are twenty-four such grooves 322 on each gearwheel 320 and they extend parallel to the axial direction of the gearwheel 320. The opposite side of the gearwheel 320 is generally flat, to which there is co-axially attached a friction part in the form of, for example, a ring 400 which may be made of rubber or the like material for enhanced frictional grip by the respective braking member 520. The ring 400 is an optional part of the gearwheel 320 but advantageous. The common gear 330 is also a bevel gear, but is much smaller than the first two gearwheels 320.

The centrifugal clutches 340A and 340B (collectively 340) have the same construction. Each centrifugal clutch 340 is formed by a central hub 341 and eight (i.e. at least two) identical claws or keying members 348 which are connected by respective identical flexible links 349 to the hub 341 in an equiangular manner about the hub 341. Each of the flexible links 349 extends from the hub 341 along a spiral path that terminates in a skewed direction or angle at the associated keying member 348, in which direction or at which angle the associated keying member 348 is supported.

The keying members 348 are provided by co-parallel rods 348, each of a circular cross-section, in a cylindrical arrangement, with the rods 348 extending axially of the cylindrical arrangement and the links 349 lying on an imaginary plane at one end of the cylindrical arrangement (FIGS. 3A to 3C).

The two centrifugal clutches 340A and 340B are arranged in opposite directions by being located in a back-to-back arrangement inside the lever's end box 313, each with its eight keying rods 348 projecting through the slots 318 individually out from the box's relevant end wall 314 and lying in the flat recesses 317 of the former 316 respectively. Thus, each centrifugal clutch 340A/340B is disposed co-axially on the respective former 316, with the flat recesses 317 locating the rods 348 respectively in a loose manner. By means of its flat recesses 317, the former 316 acts as a guiding member for determining the direction of clutching action of the associated centrifugal clutch 340A/340B. The axle 350 extends centrally through this assembly.

For each centrifugal clutch 340 and associated former 316, the flat recesses 317 each have a relatively shallower side (or part) 317S in the spiral direction of the links 349 for holding the corresponding rods 348 partially outwards and in engagement with the gearwheel 320, and a relatively deeper side (or part) 317D to give room allowing the rods 348 to recede completely into the flat recesses 317 and disengage from the gearwheel 320. By extending across the relatively shallower part 317S and the relatively deeper part 317D of each flat recess 317, the respective guiding surface 317 is inclined for interaction with the associated keying rod 348.

Being located in and projecting out of the lever's end box 313, both centrifugal clutches 340A and 340B are in a generally stationary engagement with the lever 310 for simultaneous motion such that they will turn with the lever 310 as one piece in the same direction either way upon pivoting of the lever 310 during the operation of the drive mechanism 300.

While the lever 310 is hinged with its end box 313 about the axle 350 for pivotal motion, both centrifugal clutches 340A and 340B are similarly disposed on the axle 350 for turning, facing in opposite directions. The two gearwheels 320A and 320B are also disposed on the axle 350 for turning, right next to and in engagement with the centrifugal clutches 340A and 340B respectively. Each centrifugal clutch 340A/340B is inserted into the collar 323 of the associated gearwheel 320A/320B for clutching action with the collar's grooves 322 to transmit rotational drive from the lever 310 and to the gearwheel 320A/320B.

A clutching action occurs each time upon pivoting of the lever 310 in either direction, but is only performed by one of the centrifugal clutches 340A/340B which is turned in the driving direction and hence connects, with the other centrifugal clutch 340B/340A slipping or disconnecting in the opposite non-driving direction. The centrifugal clutches 340A and 340B are therefore in releasable engagement with the respective gearwheels 320A and 320B for drive transmission.

As the centrifugal clutches 340A and 340B are turned by the lever 310, each of them will expand with its rods 348 swinging radially outwards under centrifugal action, through flexing of the associated links 349. When the centrifugal clutches 340A and 340B stop turning with the lever 310, they will contract as the links 349 connecting their rods 348 flex back inwards by virtue of the links' own resilience.

Taking the centrifugal clutch 340B turning in the spiral direction of its links 349 (i.e. in direction Q) as an example (FIGS. 6, 8A and 8B), it expands to have its rods 348 swung outwards into engagement with respective adjacent grooves 322 of the associated gearwheel 320B. The rods 348 are displaced to reach the shallower sides 317S in their associated flat recesses 317 on the former 316, where they are held about halfway outwards in engagement with the respective grooves 322 and hence the overall gearwheel 320B, in a keying action. The centrifugal clutch 340B connects. The gearwheel 320B is therefore driven to turn in the driving direction Q, and will continue to be turned until the lever 310 later stops and/or is reversed to pivot in direction P.

At such later time, the rods 348 will be displaced through reversed motion to reach the opposite deeper sides 317D in their associated flat recesses 317, which give room allowing the rods 348 to recede completely into the flat recesses 317 and disengage from the respective grooves 322 (FIGS. 5, 7A and 7B). Thus the centrifugal clutch 340B disconnects and slips in the non-driving direction P, and the gearwheel 320B stops.

In general, for interaction with each keying rod 348, the associated guiding surface 317 is inclined outwardly in the driving direction Q of the centrifugal clutch 340B to hold the rod 348 in the shallower side 317S in engagement with the gearwheel 320B in the driving direction Q, and is inclined inwardly in the opposite non-driving direction P of the centrifugal clutch 340B to release the rod 348 in the deeper side 317D from engagement with the gearwheel 320B in the non-driving direction P.

The other centrifugal clutch 340A operates in the opposite direction P, performing a clutching action in generally the same manner as described above.

The two formers 316, together with their associated centrifugal clutches 340A and 340B, are arranged back-to-back such that their flat recesses or guiding surfaces 317 are inclined in opposite directions. This leads to the result that the centrifugal clutches 340A and 340B operate in opposite directions i.e. one connecting while the other disconnecting at any time during the operation of the drive mechanism 300. Overall, the gearwheel 320A will be driven by the lever 310 pivoting in direction P, and the other gearwheel 320B instead will be driven by the lever 310 pivoting in the reversed direction Q. Upon reciprocation of the lever 310, the two gearwheels 320A and 320B will rotate in turn or alternately and in opposite directions.

The common gear 330 is supported horizontally for rotation about the vertical axis X at a position right below and between the two gearwheels 320A and 320B, being in mesh with them at right angles on opposite sides to receive rotational drive from them on opposite sides. The common gear 330 has a co-axially depending plug 331 which is releasably coupled with a central socket hole 211 of the basket's lid 210 for rotating the basket 200. Overall, the common gear 330 is in drive engagement between both gearwheels 320A and 320B and the basket 200 for rotating the basket 200.

As the common gear 330 has its opposite left and right sides in mesh with the gearwheels 320A and 320B respectively, the rotational drive in opposite directions received from the gearwheels 320A and 320B is in operation combined or merged by the common gear 330 into a unidirectional rotational drive, i.e. in single direction R (FIG. 1), for rotating the basket 200 via its lid 210.

The gearwheel 320A and the common gear 330 constitute a train of gears, and the other gearwheel 320B and the common gear 330 constitute a second train of gears running in parallel with the first train, for alternately transmitting rotational drive from the respective centrifugal clutches 340A and 340B to the basket 200. The gearwheel 320A/320B acts as the first gear in each train, and the common gear 330 is included acting as the last gear in drive engagement with the basket 200 for rotating the basket 200.

The gearwheels 320A and 320B are at an upstream position in the drive transmission path relative to the load i.e. basket 200. It is found that braking applied at such an upstream position is particularly effective, at least more effective than that applied to the load i.e. the basket 200 or its lid 210. Being the first gear in the gear trains transmitting drive, the gearwheel 320A/320B is closest to the source of drive, and this arrangement further enhances the braking efficacy.

It is noted that the unidirectional drive rotating the basket 20 is transmitted from the two gearwheels 320A and 320B alternately in an intermittent manner as the lever 310 is reversed at each of its leftmost and rightmost end positions. However, during reversal of the lever 310, the basket 200 especially when it is loaded with content will continue to rotate by inertia or momentum i.e. to freewheel without significant obstruction, only other than friction in the rotating system, because both centrifugal clutches 340A and 340B will momentarily disconnect each time when the lever 310 reverses.

Referring now to the brake mechanism 500, it has a brake body 510 which is hollow and whose wall carries the aforesaid pair of braking members 520 on opposite sides thereof. The brake body 510 is located on and attached to the housing cover 110 and extending across the top of the central recess 111 to cover or close the central recess 111. The brake body 510 is of a shell-like shape and generally matching the outline of the upper halves of the two gearwheels 320A and 320B for enclosing and surrounding the same, which protrude upwardly out of the central recess 111, thereby concealing the otherwise exposed part of the drive mechanism 300 from sight, which is not intended for user's access.

The matching of shape brings the braking members 520 adjacent the gearwheels 320A and 320B respectively and on opposite sides thereof, in close proximity to but spaced slightly apart from the respective friction rings 400 thereon, for frictional engagement therewith. Each braking member 520 is provided by a part of the wall of the brake body 510, which may be partially cut to form a round or oblong tab that only remains connected at one end, for inward depression laterally into frictional engagement with the gearwheel 320A/320B via the respective friction ring 400. Upon release, the tabs will self return or disengage under own resilience. Each tab is thickened outwards to form a knob for convenience of pressing.

The parallel or side-by-side arrangement of the two gearwheels 320A and 320B with their friction rings 400 on the outside further facilitates manual operation. The user only needs to pinch or squeeze the two knobs on opposite sides with his/her index finger and thumb to press both braking members 520 in opposite directions into frictional engagement with the gearwheels 320A and 320B i.e. against the corresponding friction rings 400 to stop rotation of the gearwheels 320A and 320B and in turn the basket 200.

Referring now to FIGS. 9 to 13B of the drawings, there is shown a second food processing apparatus embodying the invention, which is also a salad spinner 10Z and has a construction similar to that of the first salad spinner 10, with equivalent parts and components designated by the same reference numerals suffixed by a letter "Z", and operates in a similar manner, unless otherwise stated.

In terms of similarities, this salad spinner 10Z includes a generally cylindrical housing having a round top cover 110Z, a generally cylindrical basket 200Z (see FIG. 1) located in the housing and supported for rotation about a common vertical central axis, and a drive mechanism 300Z supported by the cover 110Z for rotating the basket 200Z so as to spin off water from salad or vegetable contained in the basket 200Z. There is also a brake mechanism 500Z which is supported by the housing, and partially located in a recessed central region or central recess 111Z of the housing cover 110Z, for braking the basket 200Z to stop rotation of the basket 200Z.

The drive mechanism 300Z and brake mechanism 500Z each have a partly different construction and operate in an improved manner.

The drive mechanism 300Z is formed by a manual operating member 310Z, and a set of gears having a pair of gearwheels 320AZ and 320BZ and a third, common gear 330Z arranged to be rotated by the manual operating member 310Z and in drive transmission with the basket 200Z for in turn rotating the basket 200Z. The drive mechanism 300Z includes a pair of centrifugal clutches 340AZ and 340BZ provided between the manual operating member 310Z and the gearwheels 320AZ and 320BZ respectively for transmitting rotational drive from the manual operating member 310Z to the gearwheels 320AZ and 320BZ.

In passing, the brake mechanism 500Z incorporates a pair of braking members 520Z which are frictionally engageable with the gearwheels 320AZ and 320BZ respectively to stop rotation of the basket 200Z, as will be described later.

The manual operating member 310Z is implemented by a reciprocating operating lever 310Z which has an inner end 311Z pivotably connected in the central recess 111Z of the housing cover 110Z by means of a horizontal axle 350Z that extends across the top of the central recess 111Z.

Figure 9:
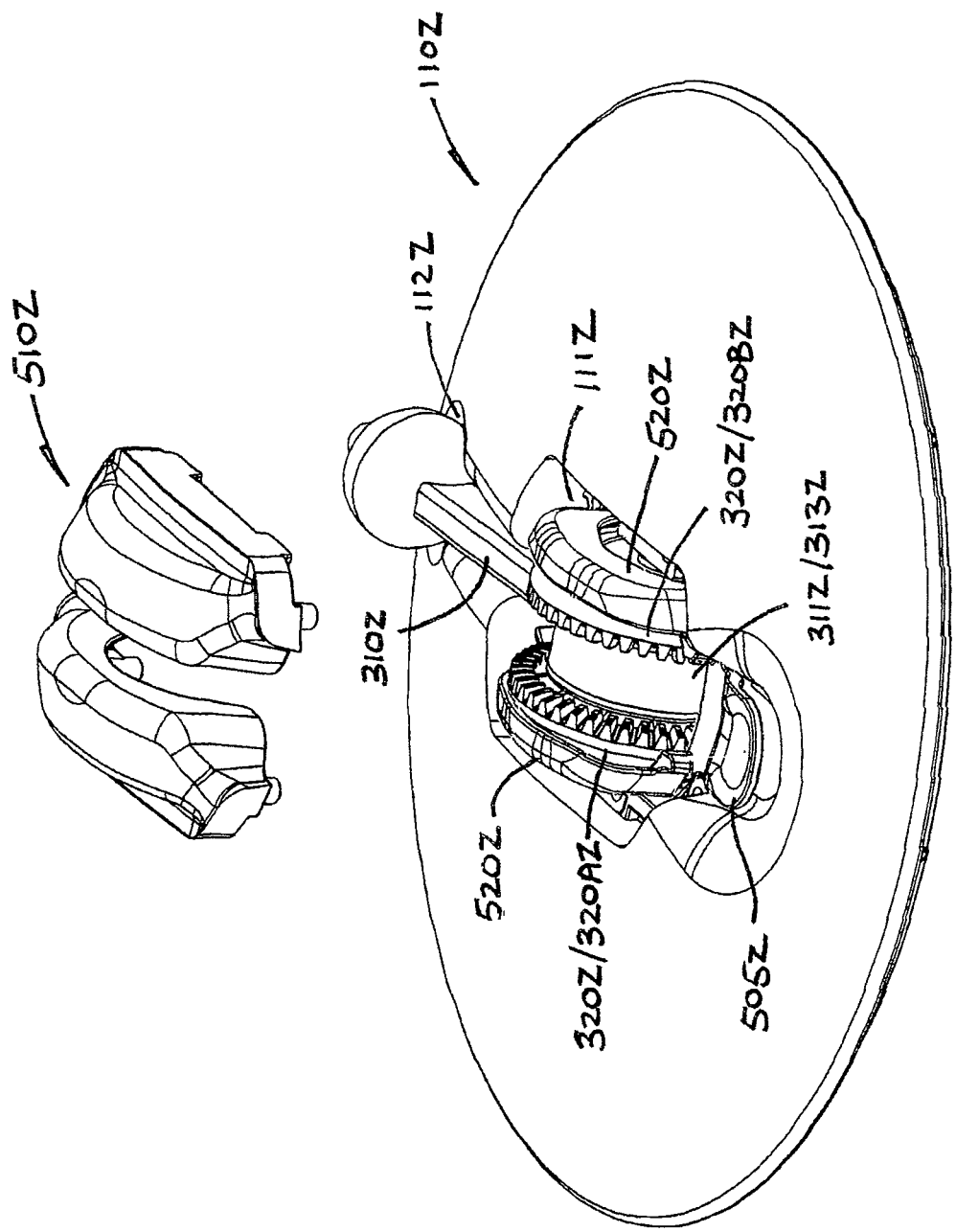
FIG. 9 is a perspective view of a drive mechanism supported in a top cover of a second embodiment of a food processing apparatus in accordance with the invention.

An outer free end 312Z of the lever 310Z terminates in the form of a knob for user's manipulation. The lever 310Z is pivotable in opposite directions P and Q (FIGS. 10 and 11B/12B) between the left and right sides on the cover 110 through an angle of about 160° for operating the drive mechanism 300Z. The cover 110Z is formed with an oblong recess 112Z as an extension of the central recess 111Z and shaped to match the lever 310Z, partially into which recess 112Z the lever 310Z may be pivoted for storage (FIG. 9).

The inner end 311Z of the lever 310Z is expanded to form a two-part flat cylindrical box 313Z that is disposed co-axially about the axle 350Z for pivotal motion. The box 313Z has two opposite flat circular end walls 314Z, through each of which there are three (instead of eight compared to the first embodiment) identical slots 318Z extending evenly in a circular arrangement about the axle 350Z. Each of these slots 318Z has a generally flat elliptical shape and extends along its length in the circumferential direction with respect to the axle 350Z.

Each end wall 314Z bears a generally cylindrical hollow former 316Z which protrudes co-axially outwards from the end wall 314Z, having a cross-section surrounded by the circularly-arranged slots 318Z. On and around its cylindrical surface, the former 316Z is shaped to form three flat recesses 317Z, each including a guiding surface 317Z, at equiangular positions and in alignment with and adjoining the slots 318Z respectively. By sharing half of the generally flat elliptical cross-section of the respective slot 318Z, each guiding surface 317Z has a flat semi-elliptical cross-section or in general a convex cross-section.

Both gearwheels 320AZ and 320BZ (collectively 320Z) are bevel gearwheels of identical construction, each having an outer periphery bearing a ring of gear teeth 321Z and an inner periphery bearing a ring of recesses 322Z. The recesses 322Z have an identical part-circular cross-section and are provided by evenly-distributed uniform grooves 322Z on and around the inner surface of an inner cylindrical collar 323Z. The collar 323Z is formed co-axially and integrally on the same inner side of the gearwheel 320Z as the gear teeth 321Z.

There are twenty-four such grooves 322Z on each gearwheel 320Z and they extend parallel to the gearwheel's axial direction. The opposite side of the gearwheel 320Z is generally flat, to which there is co-axially attached a friction part in the form of, for example, a ring 400Z which may be made of rubber or the like material for enhanced frictional grip by the respective braking member 520Z. The ring 400Z is an optional part of the gearwheel 320Z but advantageous. The common gear 330Z is also a bevel gear, but is much smaller than the first two gearwheels 320Z.

The centrifugal clutches 340AZ and 340BZ (collectively 340Z) have the same construction. Each centrifugal clutch 340Z is formed by a central hub 341Z and three (i.e. at least two) identical claws or keying members 348Z which are connected by respective identical flexible links 349Z to the hub 341Z in an equiangular manner about the hub 341Z. Each of the flexible links 349Z extends from the hub 341Z along a spiral path that terminates in a skewed direction or angle at the associated keying member 348Z, in which direction or at which angle the associated keying member 348Z is supported.

The keying members 348Z are provided by co-parallel rods 348Z each having a circular cross-section, in a cylindrical arrangement with the rods 348Z extending axially of the cylindrical arrangement and the links 349Z lying on an imaginary plane at one end of the cylindrical arrangement.

The two centrifugal clutches 340AZ and 340BZ are arranged in opposite directions by being located in a back-to-back arrangement inside the lever's end box 313Z, each with its three keying rods 348Z projecting through the slots 318Z individually out from the box's relevant end wall 314Z and lying in the flat recesses 317Z of the former 316Z respectively. Thus, each centrifugal clutch 340AZ/340BZ is disposed co-axially on the respective former 316Z, with the flat recesses 317Z locating the rods 348Z respectively in a loose manner. By means of its flat recesses 317Z, the former 316Z acts as a guiding member for determining the direction of clutching action of the associated centrifugal clutch 340AZ/340BZ. The axle 350 extends centrally through this assembly.

By having a convex cross-section, each flat recess 317Z has a pair of opposite ends 317SZ each providing a relatively shallower part 317SZ for holding the corresponding rod 348Z partially outwards and in engagement with the gearwheel 320Z and, a middle portion 317DZ between the opposite ends 317SZ, which provides a relatively deeper part 317DZ to give room allowing the rod 348Z to recede completely into the flat recess 317Z and disengage from the gearwheel 320Z.

The flat recess 317Z may be taken to have a pair of opposite left and right guiding surfaces 317Z, with the left guiding surface 317Z extending across the left shallower end 317SZ and the deeper middle portion 317DZ and the right guiding surface 317Z extending across the right shallower end 317SZ and the deeper middle portion 317DZ. The left and right guiding surfaces 317Z are inclined or skewed at a small angle of about 5° to 10° from the circumferential direction in opposite clockwise and anti-clockwise directions.

Thus, the left and right guiding surfaces 317Z, which are provided on or part of the former 316Z acting as a guiding member as described above, are inclined in opposite directions symmetrically about a radius that extends from the axle 350 through to the middle of the flat recess 317Z. Hence, insofar as its part providing the left and right guiding surfaces 317Z is concerned, the former 316Z is inclined in opposite directions. By extending across respective relatively shallower parts 317SZ and the relatively deeper part 317DZ of each flat recess 317Z, the respective guiding surfaces 317Z are each inclined in opposite directions for selective interaction with the associated keying rod 348Z.

Figure 10:
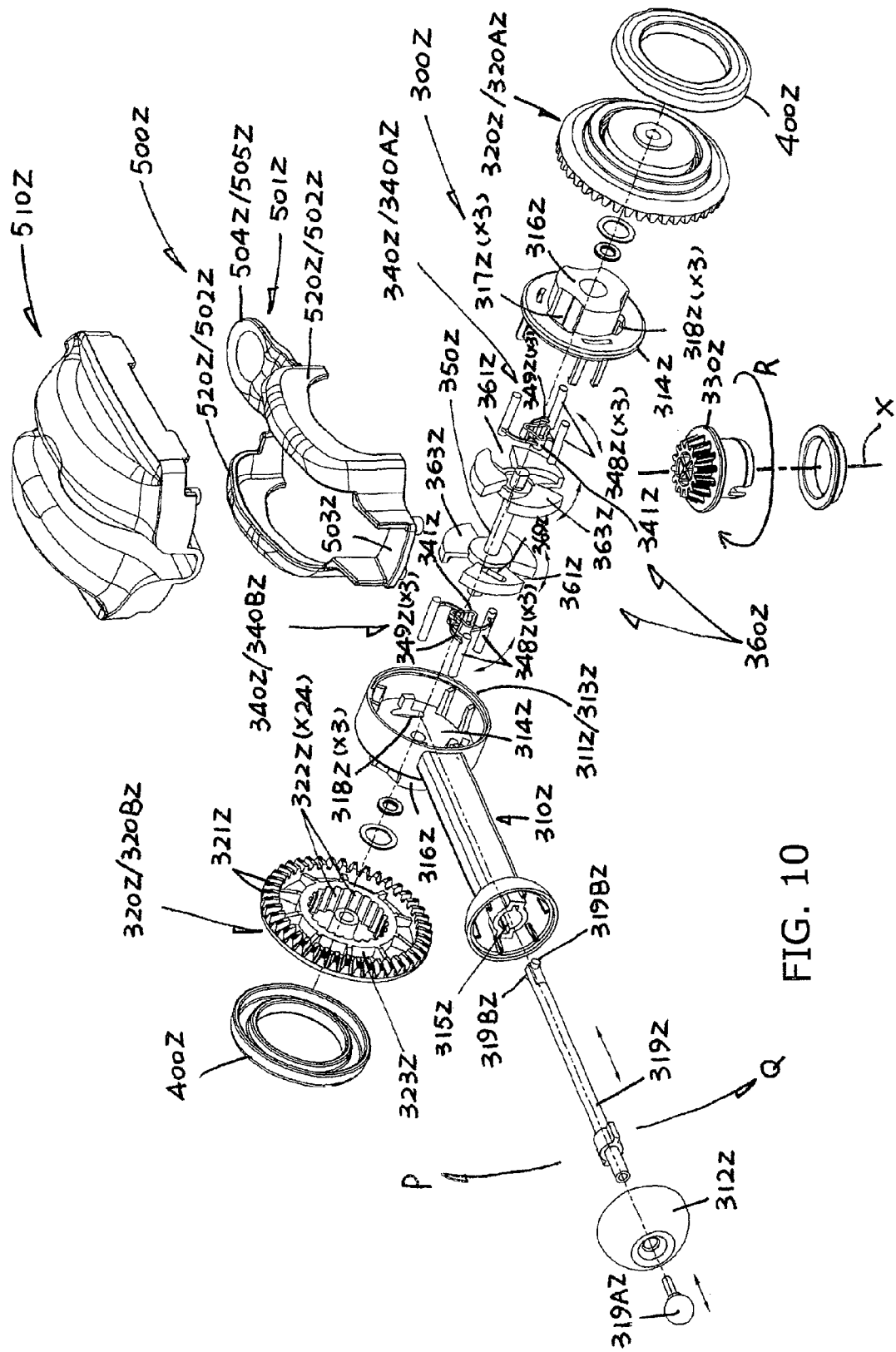
FIG. 10 is an exploded perspective view of the drive mechanism of FIG. 9, including a brake mechanism for stopping rotation of an internal basket.
Figure 10A:
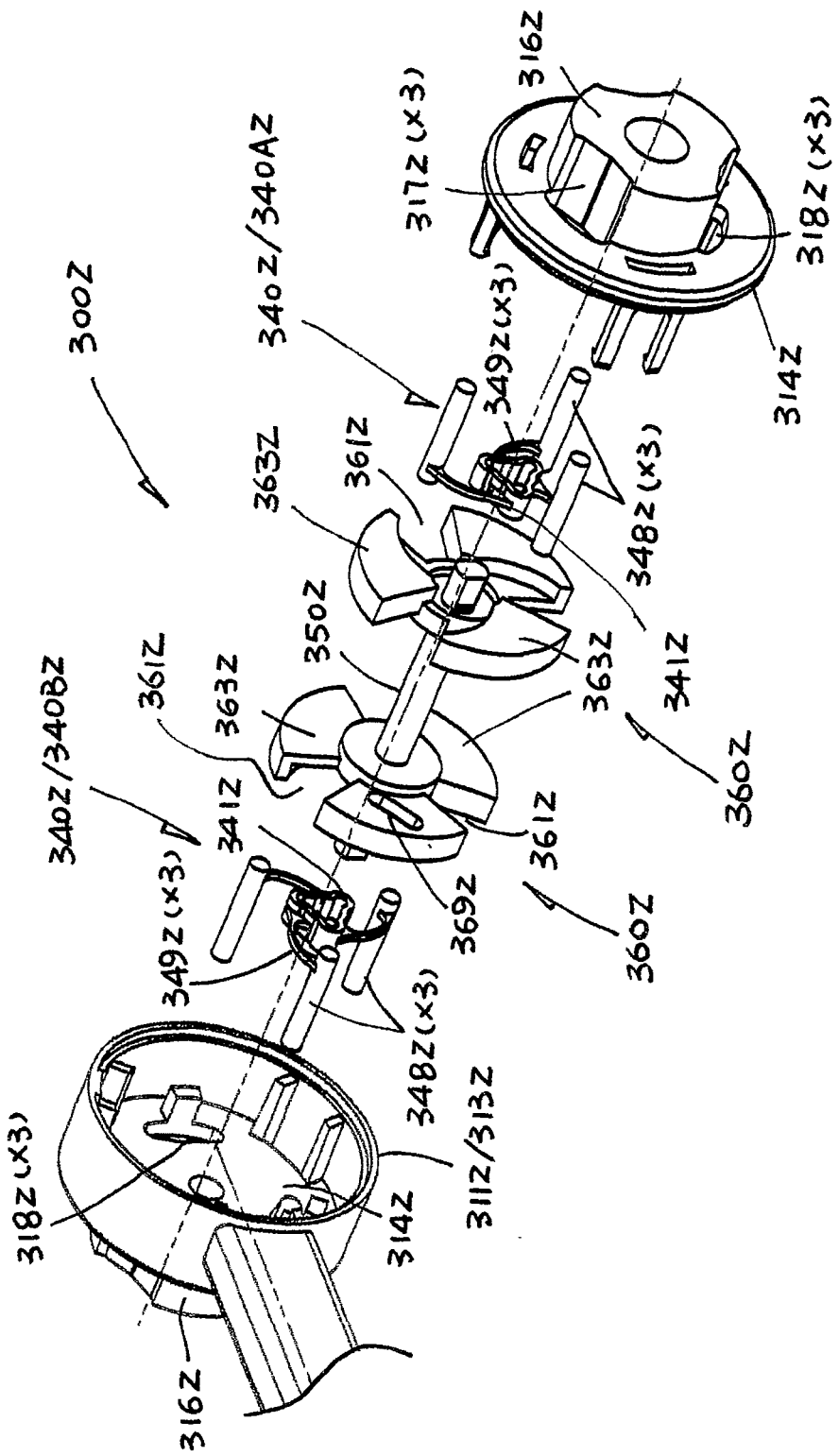
FIG. 10A is an enlarged view of a portion of the drive mechanism including a brake mechanism that is shown in FIG. 10.
Figures 11A, 11B:
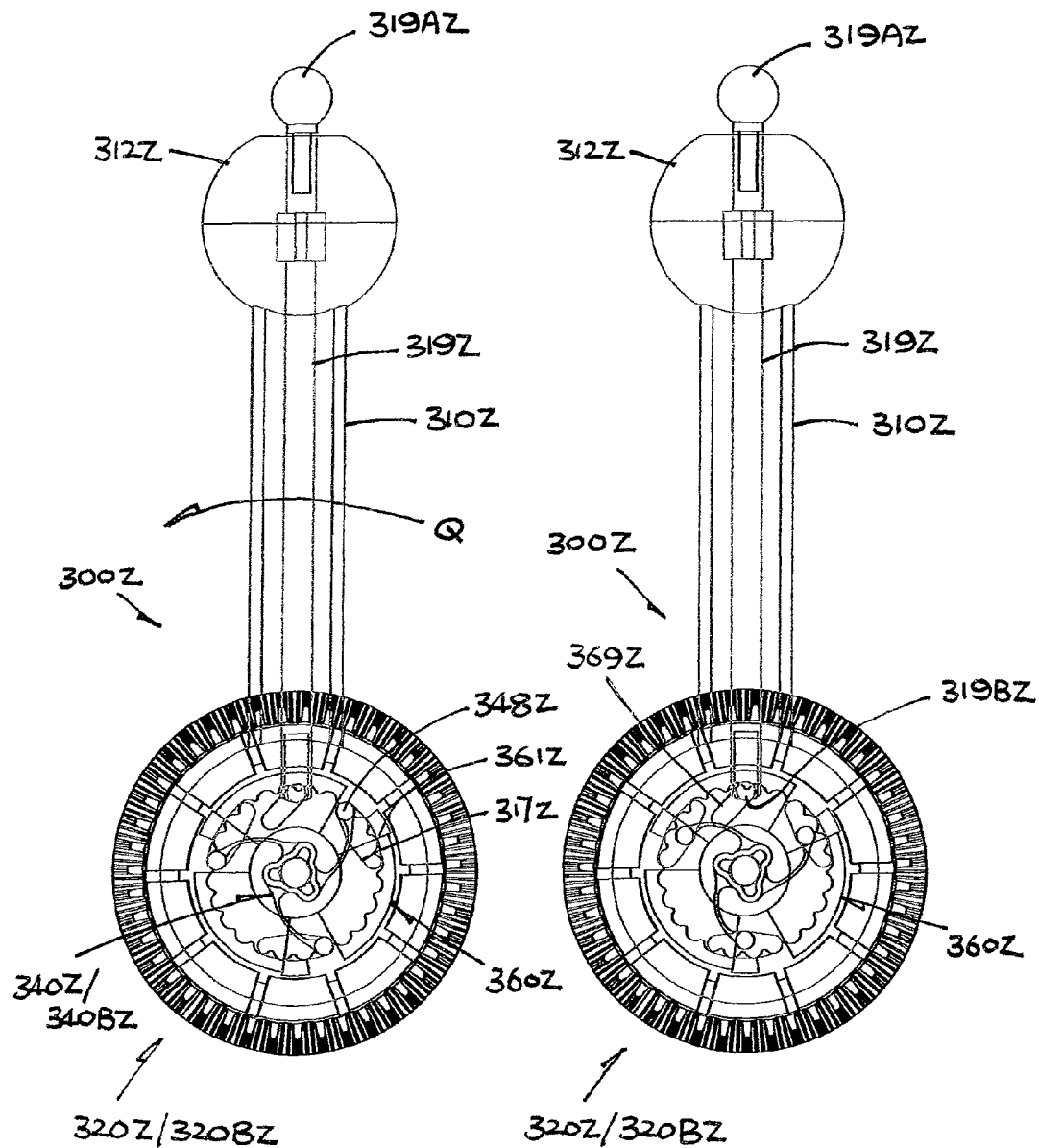
FIGS. 11A and 11B are side views which show the drive mechanism of FIG. 10 stopped and rotating clockwise respectively.

As part of the drive mechanism 300Z, also located inside the lever's end box 313Z is a pair of circular selectors 360Z which have generally the same construction, each of a circular disc-like shape and having three equiangularly-spaced identical segments 363Z with a cutout or gap 361Z formed between adjacent segments 363Z of each pair. The selectors 360Z are disposed back-to-back on the axle 350Z, each facing behind a respective centrifugal clutch 340AZ/340BZ (FIGS. 10 and 10A). The selectors 360Z each have, on its back side and at an eccentric position, a 45° slanted slot 369A which is aligned with the slot 369Z on the other selector 360Z.

Each selector 360Z has, on its front side, a star-shaped recess which is formed by the three gaps 361Z and a central recess surrounded by the gaps 361Z. The star-shaped recess accommodates and thus angularly engages, in a loose manner, the back of the associated centrifugal clutch 340AZ/340BZ so as to restrict or determine the extent of angular movement of the clutch 340AZ/340BZ relative to the selector 360Z. This in turn restricts or determines the extent of sliding movement and hence interaction of the keying rods 348Z with respect to the corresponding flat recesses 317Z and, in particular, as between the left and right guiding surfaces 317Z of the recesses 317Z, or either one left/right guiding surface 317Z selected from the pair of guiding surfaces 317Z.

Through adjustment of their angular position, the selectors 360Z are operable to select either a first set of the left guiding surfaces 317Z or a second set of the right guiding surfaces 317Z of the flat recesses 317Z for interaction with the associated keying rods 348Z of the centrifugal clutches 340AZ and 340BZ in the respective driving direction, on either side of the lever 310Z (or its end box 313Z), by aligning the keying rods 348Z with the selected set of left or right guiding surfaces 317Z of the associated flat recesses 317Z. This makes the drive mechanism 300Z operable to rotate the basket 200Z selectively in either one of opposite directions.

As is apparent from the foregoing description, each former 316Z acts as a guiding member in engagement with the associated centrifugal clutch 340AZ/340BZ (i.e. by the latter's keying rods 348Z) for determining the direction of clutching action of the centrifugal clutch 340AZ/340BZ. The associated selector 360Z is in engagement with the centrifugal clutch 340AZ/340BZ for changing the relative angular position between the centrifugal clutch 340AZ/340BZ (i.e. the latter's keying rods 348Z) and the guiding member, i.e. former 316Z, in order to select either one of two opposite directions of clutching action, thereby enabling the drive mechanism 300Z to rotate the basket 200Z selectively in opposite directions. The former 316Z includes three pairs of left and right guiding surfaces 317Z, each pair being inclined in opposite directions for selective engagement with the keying rods 348Z of the centrifugal clutch 340AZ/340BZ dependent upon the relative angular position between the centrifugal clutch 340AZ/340BZ and the former 316Z.

The angular position of both selectors 360Z is adjustable by means of a manual operator in the form of an elongate member or rod 319Z which passes internally or co-axially through the operating lever 310Z. The rod 319Z has an outer end that projects out of the lever's outer end 312Z and is tipped with a small knob 319AZ to facilitate gripping to pull the rod 319Z slightly outwardly of the lever 310Z and pressing to push the rod 319Z back in. An inner end of the rod 319Z is formed with a pair of laterally-projecting pegs 319BZ on opposite sides, which engage and couple with the slots 369Z on the back of the selectors 360Z respectively.

Upon being pulled or pushed relative to the lever 310Z as described above, the rod 369Z adjusts the angular position of the selectors 360Z in tandem, to a small extent sufficient to select between, i.e. either one set of, the first set of left guiding surfaces 317Z and the second set of right guiding surfaces 317Z of the flat recesses 317Z for interaction with the associated keying rods 348Z of the centrifugal clutches 340AZ and 340BZ in the respective driving direction. The first set of left guiding surfaces 317Z of the flat recesses 317Z, on either side of the lever 310Z, is inclined at a small angle of about 5° to 10° from the circumferential direction in the clockwise direction. The second set of right guiding surfaces 317Z of the flat recesses 317Z, on either side of the lever 310Z, is inclined at the same angle from the circumferential direction but in the opposite, anti-clockwise direction.

These two sets of opposite guiding surfaces 317Z of the flat recesses 317Z interact with the associated keying rods 348Z of the centrifugal clutches 340AZ and 340BZ in opposite directions, thereby resulting in rotation of the basket 200Z in the subject salad spinner 10Z in opposite directions. The direction of rotation of the basket 200Z is selectable by using the rod 319Z inside the operating lever 310Z as described above.

By being located in and projecting out of the lever's end box 313Z, both centrifugal clutches 340AZ and 340BZ are in a generally stationary engagement with the lever 310Z for simultaneous motion such that they will turn with the lever 310Z as one piece in the same direction either way upon reciprocating pivotal movement of the lever 310Z during the operation of the drive mechanism 300Z.

While the lever 310Z is hinged with its end box 313Z about the axle 350Z for pivotal motion, both centrifugal clutches 340AZ and 340BZ are similarly disposed on the axle 350Z for turning, facing in opposite directions. The two gearwheels 320AZ and 320BZ are also disposed on the axle 350Z for turning, right next to and in engagement with the centrifugal clutches 340AZ and 340BZ respectively. Each centrifugal clutch 340AZ/340BZ is inserted into the collar 323Z of the associated gearwheel 320AZ/320BZ for clutching action with the collar's grooves 322Z to transmit rotational drive from the lever 310Z and to the gearwheel 320AZ/320BZ.

A clutching action occurs each time upon pivoting of the lever 310Z in either direction, but is only performed by one of the centrifugal clutches 340AZ/340BZ which is turned in the driving direction and hence connects, with the other centrifugal clutch 340BZ/340AZ slipping or disconnecting in the non-driving direction. The centrifugal clutches 340AZ and 340BZ are therefore in releasable engagement with the respective gearwheels 320AZ and 320BZ for drive transmission.

As the centrifugal clutches 340AZ and 340BZ are turned by the lever 310Z, each of them will expand with its rods 348Z swinging radially outwards under centrifugal action, through flexing of the associated links 349Z. When the centrifugal clutches 340AZ and 340BZ stop turning with the lever 310Z, they will contract as the links 349Z connecting their rods 348Z flex back inwards by virtue of the links' own resilience.

The following description is based on the selection and use of the set of right guiding surfaces 317Z of the flat recesses 317Z for interaction with the associated keying rods 348Z of the centrifugal clutches 340AZ and 340BZ.

Taking the centrifugal clutch 340BZ turning in direction Q as an example (FIGS. 11A and 11B), it expands to have its rods 348Z swung outwards into engagement with respective adjacent grooves 322Z of the associated gearwheel 320BZ. The rods 348Z are displaced to reach the shallower ends 317SZ in their associated flat recesses 317Z on the former 316Z, where they are held about halfway outwards in engagement with the respective grooves 322Z and hence the overall gearwheel 320BZ, in a keying action. The centrifugal clutch 340BZ connects. The gearwheel 320BZ is therefore driven to turn in the driving direction Q, and will continue to be turned until the lever 310Z later stops and/or is reversed to pivot in direction P.

At such later time, the rods 348Z will be displaced through reversed motion to reach the opposite deeper middle portions 317DZ in their associated flat recesses 317Z, which give room allowing the rods 348Z to recede completely into the flat recesses 317Z and disengage from the respective grooves 322Z. Thus the centrifugal clutch 340BZ disconnects and slips in the non-driving direction P, and the gearwheel 320BZ stops.

In general, for interaction with each keying rod 348Z, the associated right guiding surface 317Z is inclined outwardly in the driving direction Q of the centrifugal clutch 340BZ to hold the rod 348Z in the shallower end 317SZ in engagement with the gearwheel 320BZ in the driving direction Q, and is inclined inwardly in the opposite non-driving direction P of the centrifugal clutch 340BZ to release the rod 348Z in the deeper middle potion 317DZ from engagement with the gearwheel 320BZ in the non-driving direction P.

The other centrifugal clutch 340AZ operates in the opposite direction P, performing a clutching action in generally the same manner as described above.

The two formers 316Z, together with their associated centrifugal clutches 340AZ and 340BZ, are arranged back-to-back such that their left, or right, guiding surfaces 317Z are inclined in opposite directions. This leads to the result that the centrifugal clutches 340AZ and 340BZ operate in opposite directions i.e. one connecting while the other disconnecting at any time during the operation of the drive mechanism 300Z. Overall, the gearwheel 320AZ will be driven by the lever 310Z pivoting in direction P, and the other gearwheel 320BZ instead will be driven by the lever 310Z pivoting in the reversed direction Q. Upon reciprocation of the lever 310Z, the two gearwheels 320AZ and 320BZ will rotate in turn or alternately and in opposite directions.

The common gear 330Z is supported horizontally for rotation about the vertical axis X at a position right below and between the two gearwheels 320AZ and 320BZ, being in mesh with them at right angles on opposite sides to receive rotational drive from them on opposite sides. The common gear 330Z is coupled with the basket 200Z for rotating the basket. Overall, the common gear 330Z is in drive engagement between both gearwheels 320AZ and 320BZ and the basket 200Z for rotating the basket 200Z.

As the common gear 330Z has its opposite left and right sides in mesh with the gearwheels 320AZ and 320BZ respectively, the rotational drive in opposite directions received from the gearwheels 320AZ and 320BZ is in operation combined or merged by the common gear 330Z into a unidirectional rotational drive, i.e. in single direction R (FIG. 10), for rotating the basket 200Z.

Upon the selection and use of the other set of left guiding surfaces 317Z of the flat recesses 317Z for interaction with the associated keying rods 348Z of the centrifugal clutches 340AZ and 340BZ, the aforesaid description also applies, and hence is not repeated herein for clarity, though all the directions referred to should be reversed as is apparent.

The installation of the selectors 360Z together with the rod 319Z makes it possible to switch or reverse the direction of rotation of the basket 200Z by adjusting the operation of the centrifugal clutches 340AZ and 340BZ. The provision of the rod 319Z inside or generally in close proximity to the operating lever 310Z, that rotates the basket 200Z, enhances convenience of use. It is observed that periodical reversal of the direction of rotation of the basket 200Z will speed up and render the dehydration process more effective.

Referring now to the brake mechanism 500Z, it has a brake body 501Z which provides the aforesaid braking members 520Z and is protected by a shroud 510Z. The brake body 501Z and shroud 510Z are located on and attached to the housing cover 110Z, extending across the top of the central recess 111Z to cover or close the central recess 111Z. The shroud 510Z, and similarly for the brake body 501Z, has a shell-like shape and generally matches the outline of the upper half of the two gearwheels 320AZ and 320BZ. The shroud 510Z encloses and surrounds the gearwheels' upper halves, which protrude upwardly out of the central recess 111Z, thereby concealing the otherwise exposed part of the drive mechanism 300Z from sight and access.

Fitting inside the shroud 510Z, the brake body 5012 has a simpler hollow structure also surrounding the gearwheels' upper halves, which consists of a pair of opposed left and right side members 502Z and front and rear end parts 503Z and 504Z interconnecting the two side members 502Z across their opposite ends. The side members 502Z act as the braking members 520Z, being mirror images of one another, each having an inverted U-shaped profile with a curved cross-section and extending transversely across, and in close proximity to but spaced slightly apart from, an upper part of the corresponding gearwheel 320AZ/320BZ and hence also the friction ring 400Z (FIG. 13A) for frictional engagement with the friction ring 400Z by its periphery to brake the respective gearwheel 320AZ/320BZ and in turn the basket 200Z.

The brake body 5012 is secured at its front end part 503Z to the housing cover 110Z to support its rear end part 504Z for depression to move or pivot downwards to bring the side members 502Z or the braking members 520Z into frictional engagement with the gearwheel 320AZ/320BZ from above via the corresponding friction rings 400Z for braking (FIG. 13B). To facilitate depression, the rear end part 504Z is provided with a press tab 505Z that sticks out from the shroud 510Z to the rear. Upon release of the press tab 505Z when the basket 200Z is stopped, the side members 502Z recede under own resilience of the brake body 501Z to terminate the braking action.

Being provided on top of the housing cover 110Z and operable downwardly, the press tab 505Z and hence the overall brake mechanism 500Z, for being a vertically-applied brake, is convenient to operate.

As is apparent from the foregoing description, the centrifugal clutches 320/320Z have the advantages of being simple in construction and light in weight and are user-selectable in terms of direction of operation. Although centrifugal clutch is an essential feature of the present invention, its specific form is subject to change and/or modification. It is therefore envisaged that any other suitable forms of centrifugal clutches may be employed to perform the invention.

It is noted that the centrifugal clutch of the invention is a mechanical device that causes or transmits movement in only one direction, and may be referred to as a ratchet or the like in general or at least for the purpose of the present invention.

Although the invention is applicable to a food or salad spinner as in the described embodiment, it is envisaged that other food processing apparatus, such as food mixers (e.g. salad dressing mixer) and food grinders, may employ the invention.

The invention has been given by way of example only, and various other modifications of and/or alterations to the described embodiments may be made by persons skilled in the art without departing from the scope of the invention as specified in the appended claims.

The invention claimed is:

1. A food processing apparatus comprising:
a housing;
a food processing device supported in the housing for rotation about an axis of rotation of the food processing device;
a drive mechanism supported by the housing for rotating the food processing device about the axis of rotation of the food processing device to process food in the housing, the drive mechanism comprising
a manual operating member supported for reciprocation in opposite directions,
a gearwheel rotated by the reciprocation of the manual operating member and coupled to the food processing device for, in turn, rotating the food processing device about the axis of rotation of the food processing device, and
a centrifugal clutch coupling the manual operating member to the gearwheel for transmitting a rotational drive force, produced by the reciprocation of the manual operating member, to the gearwheel, wherein
the centrifugal clutch selectively transmits the rotational drive force to the gearwheel in one of opposite first and second rotational directions and withholds the rotational drive force from the gearwheel in the other of the opposite first and second rotational directions and slips in the other of the first and second opposite rotational directions,
the centrifugal clutch is in stationary engagement with the manual operating member for simultaneous reciprocation of the manual operating member and rotation of the centrifugal clutch about a rotational axis of the centrifugal clutch, and is in releasable engagement with the gearwheel, and
the centrifugal clutch comprises
at least two keying members selectively coupling the manual operating member to the gearwheel, and
flexible links flexibly supporting the respective keying members, at supported ends of the respective keying members, so that the respective keying members, at free ends of the respective keying members, move outwards with respect to the rotational axis of the centrifugal clutch in response to centrifugal force, upon rotation of the centrifugal clutch about the rotational axis of the centrifugal clutch, and thereby engage the gearwheel; and
a brake mechanism supported by the housing for braking the food processing device, the brake mechanism comprising a braking member for frictional engagement to stop rotation of the food processing device.

2. The food processing apparatus as claimed in claim 1, wherein
the centrifugal clutch includes a cylindrical former having respective guiding surfaces for interaction with respective keying members at the free ends of the keying members, and
the respective guiding surfaces are inclined relatively outwardly, with respect to the rotational axis of the centrifugal clutch, for holding the free ends of the keying members in engagement with the gearwheel in a driving direction that rotates the gearwheel and are inclined relatively d inwardly, with respect to the rotational axis of the centrifugal clutch, in a non-driving direction of the centrifugal clutch, opposite the driving direction, in which the free ends of the respective keying are disengaged from the gearwheel.

3. The food processing apparatus as claimed in claim 2, wherein the keying members include respective parallel keying rods in a circular arrangement, with the keying rods extending axially with respect to the rotational axis of the centrifugal clutch and with the flexible links lying on an imaginary plane.

4. The food processing apparatus as claimed in claim 3, wherein
the cylindrical former that is coupled to the manual operating member has a plurality of recesses that are generally parallel to the rotational axis of the centrifugal clutch, and
each of the recesses includes a respective one of the guiding surfaces.

5. The food processing apparatus as claimed in claim 4, wherein
each recess has at least one relatively shallower part, relative to the rotational axis of the centrifugal clutch, for holding a respective keying rod in engagement with the gearwheel, and a relatively deeper part, relative to the rotational axis of the centrifugal clutch, allowing the keying rod to disengage from the gearwheel, and
each guiding extends from one of the relatively shallower parts to the relatively deeper part.

6. The food processing apparatus as claimed in claim 5, wherein
each recess has two ends, each end corresponding to one of the relatively shallower parts of the recess, and a middle portion located between the ends and corresponding to the relatively deeper part, so that respective guiding surfaces extend from the ends to the middle portion, and
the respective guiding surfaces of each of the recesses are inclined in opposite directions relative to each other for selective interaction with a respective keying rod in the first and second opposite rotational directions of the gearwheel.

7. The food processing apparatus as claimed in claim 6, wherein the drive mechanism includes a selector for selecting one of the guiding surfaces of each of the recesses for interaction with the keying rod in a respective one of the first and second opposite rotational directions of the gearwheel, such that the drive mechanism rotates the food processing device selectively in a selected one of first and second opposite directions about the axis of rotation of the food processing device.

8. The food processing apparatus as claimed in claim 7, wherein the selector is in engagement with the centrifugal clutch and restricts relative movement and interaction of the keying rods of the centrifugal clutch with respect to the one of the guiding surfaces of each recess and that is selected via the selector.

9. The food processing apparatus as claimed in claim 8, wherein
the selector is angularly movable for operation, and
the drive mechanism includes a manual operator for changing angular position of the selector and thereby to select between the guiding surfaces of each recess for interaction with the keying member in a respective driving direction.

10. The food processing apparatus as claimed in claim 9, wherein the manual operator comprises an elongate member located inside the manual operating member.

11. The food processing apparatus as claimed in claim 1, wherein the drive mechanism includes
a guiding member in engagement with the centrifugal clutch for determining direction of clutching action of the centrifugal clutch, and
a selector in engagement with the centrifugal clutch for changing relative position between the centrifugal clutch and the guiding member to select one of two opposite directions of clutching action, enabling the drive mechanism to rotate the food processing device selectively in either of opposite first and second driving directions about the axis of rotation of the food processing device.

12. The food processing apparatus as claimed in claim 11, wherein the guiding member is inclined, in opposite directions, for selective engagement with the centrifugal clutch, dependent upon relative position between the centrifugal clutch and the guiding member.

13. The food processing apparatus as claimed in claim 1, wherein
the drive mechanism includes a train of gears for transmitting the rotational drive force from the centrifugal clutch to the food processing device,
the gearwheel is a first gear in the train of gears, and
the train of gears includes at least one other gearwheel, as a last gear of the gear train, in engagement with the food processing device for rotating the food processing device.

14. The food processing apparatus as claimed in claim 1, wherein the brake mechanism includes a brake body which is attached to the housing and supports the braking member for frictional engagement with the gearwheel to stop rotation of the food processing device.

15. The food processing apparatus as claimed in claim 14, wherein
the braking member includes a part of the brake body, and
the part of the brake body comprises a tab for depression into frictional engagement with the gearwheel.

16. The food processing apparatus as claimed in claim 14, wherein
the braking member includes a part of the brake body, and
the part of the braking body extends across a part of the gearwheel for movement into frictional engagement with the gearwheel.

17. The food processing apparatus as claimed in claim 1, wherein the gearwheel includes a friction part and the braking member frictionally engages the gearwheel via the frictional part.

18. The food processing apparatus as claimed in claim 1, wherein the drive mechanism includes:
a pair of the centrifugal clutches;
a pair of the gearwheels which are rotated by the reciprocation of the manual operating member in opposite directions, respectively, and are coupled to the food processing device by a corresponding one of the centrifugal clutches, wherein the centrifugal clutches are located between the manual operating member and the respective gearwheel driven by the rotational drive force from the manual operating member; and
a common gear in engagement with both of the gearwheels and the food processing device for rotating the food processing device, and merging a rotational driving force, in opposite directions, received from the gearwheels, into a unidirectional rotational drive force rotating the food processing device.

19. The food processing apparatus as claimed in claim 1, wherein the axis of rotation of the food processing device is transverse to the rotational axis of the centrifugal clutch.

* * * * *